Patented Apr. 7, 1931

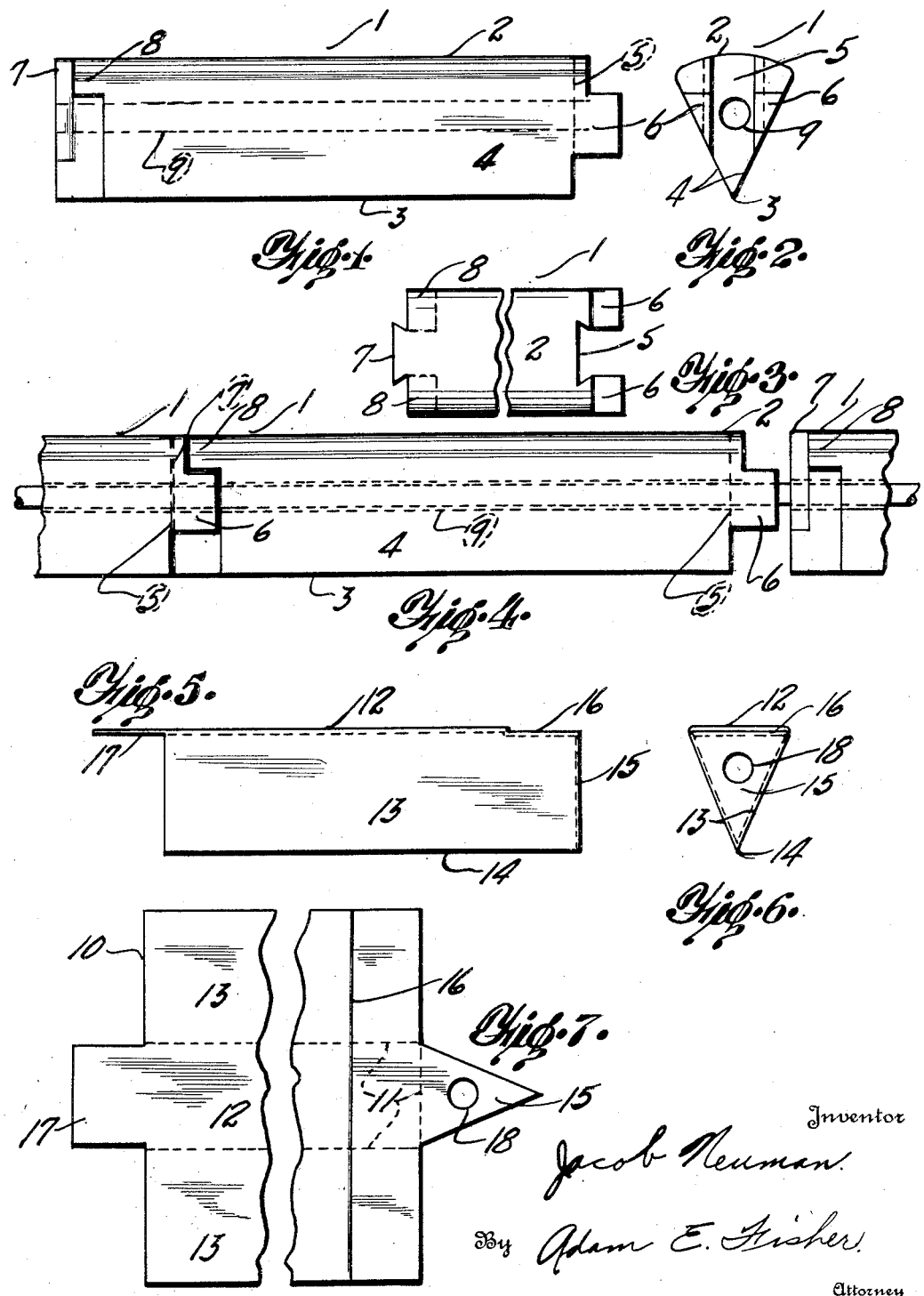

1,799,436

UNITED STATES PATENT OFFICE

JACOB NEUMAN, OF ST. LOUIS, MISSOURI

CONDUIT

Application filed December 15, 1928. Serial No. 326,165.

This invention relates generally to improvements in conduits and more particularly to a sectional conduit or carrier for electric wiring, gas or air lines or water hose and the like.

The main object of the invention is to provide a conduit which may be driven in the ground or any relatively soft element or seated in concrete or the like to carry the aforesaid wiring etc. thus making the device adaptable for use wherever a wire or line of any sort must cross a street or extend for any distance over the surface of the ground.

Another object is to provide a conduit of the above characteristics which will be simple and durable in form and cheap in manufacture.

The foregoing and other objects together with means whereby the same may be carried into effect will best be understood from the following description of certain preferred embodiments of the invention taken in connection with the accompanying drawing, wherein Figure 1 is a side view of one of the sections making up the conduit.

Figure 2 is an end view thereof.

Figure 3 is a plan view thereof partially broken away.

Figure 4 is a side view of several sections used in making up the conduit—illustrating the manner in which these sections are joined together.

Figure 5 is a side view of a modified form of section.

Figure 6 is an end view thereof; and

Figure 7 is a plan view of the blank from which the sections as shown in Figures 5 and 6 are formed.

In the embodiment of the invention shown in Figures 1 to 4 inclusive the conduit is formed of a plurality of sections denoted generally by the reference numeral 1. These sections 1 are formed of any suitable material and are substantially triangular or wedge-shaped in cross section with a convex upper face 2 and the sharp lower edge 3 formed by the converging sides 4 of the said section. One end of the sections 1 is provided with a dovetail groove 5, the margins of this groove being extended longitudinally in the form of shoulders 6 the upper edges of which are spaced from the upper face 2. The other ends of the sections are provided with dovetail tenons 7 and flanking abutments or lips 8, the said tenons 7 projecting endwise beyond the faces of the said abutments 8 as shown. The sections 1 are also provided with longitudinally extended bores 9 for a purpose to be described.

In the use of the invention the cable or hose to be carried by the conduit is passed through the bores 9. The sections 1 are then interlocked by inserting the tenons 7 in the grooves 5, the abutments 8 resting upon the shoulders 6 so that the upper faces 2 will be flush. The conduit may then be driven in or otherwise inserted in the surface over which it is to be passed. Since the upper faces 2 of the sections are convexed or rounded they will present no obstruction to traffic which may pass over the conduit.

The embodiment shown in Figures 5, 6 and 7 is assembled and used exactly as hereinbefore set forth in the description of the first embodiment. The blanks, one of which is denoted at 10, are of suitable material and shape and are bent along the dotted lines 11 to form the sections of the conduits having the upper faces 12, the converging sides 13 terminating in the lower edges 14, and the triangular end pieces 15. A portion 16 adjacent one end of the upper faces 12 is depressed or provided with a shoulder as shown and complementary lips 17 are extended from the other ends of the sections so that a plurality of sections may be assembled end to end with the lips 17 engaging the depressed portions 16 of adjacent sections as will be understood. The said triangular end pieces 15 have apertures 18 to receive the cable or hose to be carried by the conduit.

From the foregoing it will be apparent that the conduit may be constructed in any length desired either for temporary or permanent use and that it will efficiently protect the cable or hose which it carries.

While I have herein set forth certain preferred embodiments of my invention it is understood that I may vary from the same in minor structural details not departing from the spirit of the invention and within the scope of the appended claims.

I claim:

1. In a conduit, a plurality of sections, complementary grooves and tenons being formed upon opposite ends of the sections to interlock the same in end to end relationship, and complementary shoulders and abutments formed upon opposite ends of the sections, the said sections having longitudinally extending bores for the reception of a cable or hose.

2. In a conduit, a plurality of sections having dove-tail grooves at one end, shoulders extended from the margins of the said groove, and dovetail tenons at the other ends of the sections, abutments being formed at the sides of the said tenon and complementary to the said shoulders and the said sections having longitudinally extending bores.

3. In a conduit, a blank of material comprising a top portion, sides extended from the top portion, a triangular end piece extended from the end of the top portion, the said top portion being depressed adjacent the end piece, a lip extended from the end of the top portion opposite to the end piece, and the said end piece having a cable receiving aperture.

4. In a device of the kind described, a conduit formed of a blank of material comprising a top portion, sides extended from the top portion and bent downwardly therefrom in converging relationship, a triangular end piece extended from the top portion downwardly alongside the ends of the sides, the said end piece having an aperture, the top portion being depressed adjacent the end piece, and a lip extended from the opposite end of the top portion.

In testimony whereof I affix my signature.

JACOB NEUMAN.